Patented Mar. 30, 1943

2,315,044

UNITED STATES PATENT OFFICE 2,315,044

HANDLING ACID SLUDGE

David W. Bransky, Chicago, Ill., assignor to Standard Oil Company, Chicago, Ill., a corporation of Indiana No Drawing. Application June 26, 1940,
Serial No. 342,421

7 Claims. (Cl. 137—78)

This invention relates to improvements in the processing of acid sludges and in particular to the improvement in the handling of heavy sulfuric acid sludges through a pumping system.

In the refining of petroleum oils such as lubricating oils, highly refined white oils such as, for example, mineral medicinal oils, and the like, the oil is subjected to treatment with strong sulfuric acid, generally acids ranging in strength from about 93% sulfuric acid to about 104½% sulfuric acid, the latter being commonly known as fuming sulfuric acid. The acid sludge resulting from the treatment of these oils with strong sulfuric acid is separated from the treated oils and generally stored for subsequent treatment such as, for example, the recovery of the sulfuric acid from such sludges by such processes as a sludge coking process. Depending upon the type of oil treated and the strength of the sulfuric acid employed, the consistency of the acid sludge will vary from a relative fluid pumpable sludge to a heavy almost semi-solid sludge which is unpumpable or only pumpable with much difficulty. Since it is frequently necessary to pump these heavy acid sludges great distances it is highly desirable to modify the consistency of these sludges to facilitate the handling thereof through the existing pumping systems.

It is, therefore, the primary object of this invention to treat heavy acid sludges so that the same may be pumped long distances. It is another object of the invention to provide an efficient and economical method of rendering substantially unpumpable acid sludges more fluid to facilitate the pumping thereof. Other objects and advantages of the invention will become apparent from the following description thereof.

I have discovered that heavy viscous substantially unpumpable sulfuric acid sludges can be rendered pumpable by mixing such acid sludges with sulfuric acid, preferably of weaker strength than the sulfuric acid used in the treatment of the oil from which the acid sludge is obtained. For example, the acid sludge resulting from the treatment of a mineral oil with 93% sulfuric acid is made more fluid and pumpable by mixing it with a 90% sulfuric acid. I have found it most practical to employ as the carrier acid, that is the acid used to flux the acid sludge, sulfuric acid of from about 50% to about 90% strength, although it is preferable to employ sulfuric acid of from about 65% to about 75% strength. If the carrier acid is too weak or too strong difficulty is encountered in separating the carrier acid from acid sludge and the mixture of acid and sludge may become more viscous. Sulfuric acid of about 65% to about 75% strength has been found to be highly desirable as a carrier acid since it does not deteriorate the acid sludge, for instance, by hydrolysis, is readily separated for subsequent reuse, and is less likely to react with any of the oil present in the acid sludge.

The amount of acid used will depend upon the consistency of the acid sludge to be treated. An adequate and rapid method of determining the amount of sulfuric acid required is to mix the acid sludge with sufficient sulfuric acid to give a mixture having a maximum viscosity of about 40 degrees at 30 R. P. M. with a size 20 wire by the Macmichael viscometer at the pumping temperature.

In processing the sulfuric acid sludge, the acid sludge is preferably placed in a mixing tank equipped with a steam jacket and/or with a steam coil and the pre-determined amount of sulfuric acid added to the acid sludge with vigorous agitation by any suitable means such as mechanical agitation or agitation with air. To further facilitate thorough mixing of the acid sludge with the sulfuric acid the temperature of the mixture should be raised by means of the steam jacket and/or steam coil to a temperature of from about 120° F. to about 150° F. After the acid sludge and the sulfuric acid have been thoroughly mixed and the mass brought to a consistency which will facilitate pumping, it is ready to be pumped to any distant location for further processing. For example, the mixture may be pumped to a sludge coker storage tank where it is permitted to remain in a quiescent state to permit stratification and separation of the acid sludge and the sulfuric acid. The sulfuric acid may then be separated from the acid sludge and reused as a carrier acid or it may be used for the treatment of mineral oils.

While the present invention is primarily concerned with and finds its greatest utility in the preparation of pumpable sulfuric acid sludges by fluxing a carrier acid with an acid sludge in which it is substantially immiscible, it also contemplates the treatment of such acid sludges which are miscible to some extent with strong sulfuric acid. Thus, certain sulfuric acid sludges which appear fluid but possess a degree of stickiness which renders them unsuitable for pumping, such as sludges from the production of white oils with 104½ % acid may be treated with strong sulfuric acid such as, for example, 93% sulfuric acid, which is miscible with such sludges. The treatment of such sludges with strong sulfuric acid breaks down the apparent plasticity of the sulfuric acid sludge and renders it pumpable. The sulfuric acid in such cases may be recovered from the acid sludge by the well-known methods, such as the acid sludge coking and sulfuric acid contact processes.

I claim:

1. The method of conditioning heavy viscous substantially unpumpable sulfuric acid sludge to facilitate the pumping thereof, said sulfuric acid sludge being obtained from the sulfuric acid treatment of a petroleum oil, comprising mixing said sulfuric acid sludge with a carrier sulfuric acid in sufficient quantity to render the sulfuric acid sludge pumpable, the carrier sulfuric acid having a strength weaker than the sulfuric acid used in the process from which the sulfuric acid sludge is obtained and stronger than that which would cause hydrolysis of the sulfuric acid sludge, and then pumping the mixture of sludge and acid to the desired location.

2. The method of conditioning heavy viscous substantially unpumpable sulfuric acid sludge to facilitate the pumping thereof, said sulfuric acid sludge being obtained from the sulfuric acid treatment of a petroleum oil, comprising mixing said sulfuric acid sludge with a carrier sulfuric acid in sufficient quantity to render the sulfuric acid sludge pumpable, the carrier sulfuric acid having a strength weaker than the sulfuric acid used in the process from which the sulfuric acid sludge is obtained and stronger than about 50%, the strength of the carrier sulfuric acid used always being stronger than that which would cause hydrolysis of the sulfuric acid sludge being conditioned, and then pumping the mixture of sludge and acid to the desired location.

3. A method as claimed in claim 2 wherein the strength of the carrier sulfuric acid is within the approximate range of from 50% to 90%.

4. A method as claimed in claim 2 wherein the strength of the carrier sulfuric acid is within the approximate range of from 65% to 75%.

5. The method of transporting through pipe lines sulfuric acid sludge which is substantially unpumpable and substantially immiscible with sulfuric acid to facilitate the pumping thereof, said sulfuric acid sludge being obtained from the sulfuric acid treatment of a petroleum oil, comprising fluxing said sulfuric acid sludge with a substantially immiscible carrier sulfuric acid having a strength within the approximate range of 65% to 75% in sufficient quantity to modify the consistency of the said sulfuric acid sludge to a pumpable state, the strength of the carrier sulfuric acid used always being stronger than that which would cause hydrolysis of the sulfuric acid sludge being conditioned, pumping said mixture to the desired location, permitting the mixture to remain in a quiescent state to separate the carrier sulfuric acid from the sulfuric acid sludge, removing the carrier sulfuric acid and subsequently reusing the separated carrier acid for conditioning additional unpumpable sulfuric acid sludge.

6. The method of pumping heavy viscous substantially unpumpable sulfuric acid sludge obtained from the sulfuric acid treatment of a petroleum oil comprising mixing said sulfuric acid sludge with a carrier sulfuric acid in sufficient quantity to render the sulfuric acid sludge pumpable, the carrier sulfuric acid having a strength weaker than that which would cause a more viscous sludge to form and stronger than that which would cause hydrolysis of the sulfuric acid sludge, and then pumping the mixture of sludge and acid to the desired location.

7. The method of pumping heavy viscous substantially unpumpable sulfuric acid sludge obtained from the sulfuric acid treatment of a petroleum oil comprising mixing said sulfuric acid sludge with a carrier sulfuric acid in sufficient quantity to render the sulfuric acid sludge pumpable, the carrier sulfuric acid having such a strength that the sludge will not be hydrolyzed and that the mixture of carrier sulfuric acid and sulfuric acid sludge will be less viscous than the sulfuric acid sludge, and then pumping the mixture of sludge and acid to the desired location.

DAVID W. BRANSKY.